324-77.
08-08-72 XR 3,683,162 SR

United States Patent [15] 3,683,162
Jacob et al. [45] Aug. 8, 1972

[54] DIGITAL FILTERING FOR DETECTING COMPONENT FREQUENCIES FROM A SET OF PREDETERMINED FREQUENCIES

[72] Inventors: Jean-Baptiste Jacob, Kertanguy; Pierre Lavanant, Lannion, both of France

[73] Assignees: C. I. T.-Compagnie Industrielle des Telecommunications, Paris; Societe Lannionnaise D'Electronique, Lannion, France

[22] Filed: July 30, 1969

[21] Appl. No.: 846,030

[30] Foreign Application Priority Data

July 30, 1968 France....................68161172

[52] U.S. Cl...................235/156, 324/77 E, 328/167
[51] Int. Cl.................................................G06f 7/38
[58] Field of Search........235/152, 156, 164; 178/66, 178/68; 340/121 PP; 328/167; 324/77 E; 325/38

[56] References Cited

UNITED STATES PATENTS

| | | | |
|---|---|---|---|
| 3,288,940 | 11/1966 | Bennett | 340/121 X |
| 3,404,231 | 10/1968 | Aaron et al. | 179/15 UX |
| 3,521,041 | 7/1970 | Van Blerkom | 235/156 |
| 3,521,042 | 7/1970 | Van Blerkom | 235/156 |
| 3,099,742 | 7/1963 | Byrne | 235/150 |

OTHER PUBLICATIONS

Monroe, Digital Processes For Sampled Data Systems, Sept. 19, 1962, pp. 450–474.
Jones, " A Timed-Shared Digital Filter Realization" IEEE Trans. On Comp. Vol. C–18, No. 11, Nov. 1969, pp. 1027–1030.

*Primary Examiner*—Eugene G. Botz
*Assistant Examiner*—David H. Malzahn
*Attorney*—Craig & Antonelli

[57] ABSTRACT

A receiving device comprising a filtering section consisting of as many band-pass analysis filters as there are different component frequencies in the signals which can be received, and a processing section enabling an analysis of the energy in the individual filters.

8 Claims, 9 Drawing Figures

Figure 1:
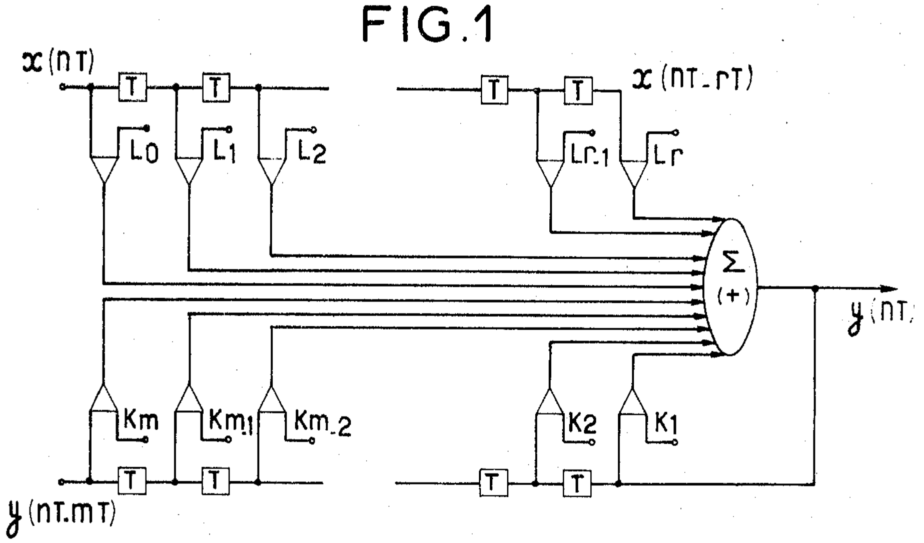

DIGITAL FILTERING FOR DETECTING COMPONENT FREQUENCIES FROM A SET OF PREDETERMINED FREQUENCIES

The present invention concerns a numerical frequency receiver, for use more particularly in the telecommunications industry.

For some years now, use has been made in telephone installations of the multifrequency code, whereby signalling between telephone exchanges may be obtained by means of voice frequency currents; a similar type of signalling will probably be used in future between the subscriber and his connecting exchange for routing the number signals transmitted by keyboard.

The apparatus, which has to ensure correct reception of information thus transmitted, despite the presence of numerous parasitic signals due to the poor quality of the lines, is the frequency receiver, which is connected via the connection network either to the circuit or to the subscriber's line.

Since the use of a single transmission frequency presents certain risks of confusion with parasitic sources, the multifrequency code provides, for the circuits, the transmission of two frequencies out of five, while the keyboard code utilized for subscribers' lines, transmits on two groups of frequencies, of which it is necessary to receive one frequency of each group.

As prior art, frequency receiving devices are known which receive analogue signals, switched then filtered by conventional means, such as inductances and capacitors, but owing to the variations in the characteristics of the constituent elements, these devices do not show good stability in the course of time.

The frequency receiving device according to the invention does not receive analogue signals but numerical signals in the form of binary coded pulses. Each circuit, which is the seat of voice audio frequency signalling, is connected to a coder on entering the exchange; the voice frequencies are sampled there at the frequency of 8000 c/s, for example, and the measurement of the sampled amplitudes is transmitted to the frequency receiver every 125 $\mu s$ by a binary number of 10 bits, which corresponds to the possible appreciation of about 1,000 different levels of the amplitude to be measured.

The device according to the invention is based on the theory of numerical linear filters, which are defined by finite difference equations, the solution of which is effected by means of Z transformation.

It is possible to quote on this subject an article by C.M. RADER and B. GOLD entitled: "DIGITAL FILTER DESIGN TECHNIQUES IN THE FREQUENCY DOMAIN" published in the American periodical PROCEEDING OF THE I.E.E.E. of February, 1967; an article by H.A. HELM entitled "THE Z TRANSFORMATION" published in the American periodical "BELL SYSTEM TECHNICAL JOURNAL" of January, 1959 and an article published in "L'ONDE ELECTRIQUE" of February, 1965 entitled "LA TRANSFORMATION Z ET LES EQUATIONS AUX DIFFERENCES (THE Z TRANSFORMATION AND DIFFERENCE EQUATIONS) by R. LEGROS.

The state of the theory having thus been recapitulated, an explanation will be given in the description with a view to the application of the said theory to the device according to the invention.

The numerical frequency receiving device according to the invention is more particularly characterized in that it consists of a "filtering" part and a "treatment" part; the filtering part comprises as many pass-band analysis filters as there are different component frequencies in the signals capable of being received; the treatment parts permits an analysis of the energy in the different filters.

According to one feature of the invention, each analysis filter comprises a computing circuit and a store; the operations to be performed by the computing circuit are:

$$Y = X - B_2Y_2 - B_1Y_1$$

$$S = Y - Y_2$$

where $X$ is the input sample, arriving at the sampling frequency, $S$ is the output sample, leaving at the same sampling frequency, $B_1$ and $B_2$ are constant coefficients characterizing the filter, $Y_1$ and $Y_2$ are intermediate results, the store of the filter retaining the quantities $B_1$, $B_2$, $Y_1$ and $Y_2$.

According to another feature of the invention, the quantities $B_1$ and $B_2$, $Y_1$ and $Y_2$ are stored in the form of logarithms to the base 2, such that multiplications are replaced by additions of logarithms, and divisions by subtractions of logarithms, while normal additions and subtractions are performed on linear quantities requiring the provision of a converter of logarithmic quantities into linear quantities and of the reverse converter of linear quantities into logarithmic quantities.

According to yet another feature of the invention corresponding to the treatment circuit are a summation circuit for the absolute values of the output signals, a store containing the "sum" results of each filter of the receiver for a certain number of samples and a circuit for the analysis of the energy in the different filters of the receiver.

According to yet another feature of the invention, the device being controlled by a time base, the operation of an analysis filter having one cell is performed in four elementary times; in the time $t_1$, the product $B_2Y_2$ is formed and is registered in the register 1, while the new sample $X$ is registered in the register 2; in the time $t_2$ the operations $X - B_2Y_2$ and $B_1Y_1$ are performed, the first result being recorded in the register 2 and the second result in the register 1, in the time $t_3$, the operation $Y = X - B_2Y_2 - B_1Y_1$ is performed, the result of which is recorded in register 2; in the time $t_4$, the operation $S = Y - Y_2$ is performed, the result of which is recorded in the register 3.

According to yet another feature of the invention, the store of the sums of the samples is a circulation store advancing in synchronism with the instants of computation relative to each of the filters comprising a word of 12 bits per filter.

According to yet another feature of the invention, the circuits analyzing the energy in the filters are formed by four shift registers receiving on command in parallel and at the same instant the contents of the first four words starting from the output of the shift store of the sums of the samples; after posting and shifting of these registers, heavily weighted in front, the outputs of the four shift registers enter the maximum value test circuit, the filter having the maximum energy corresponding to the register having the first 1 at its output.

One advantage of the device according to the invention is its stability, the characteristics of the numerical filters, being connected solely to precisions of arithmetical computations, are sensitive only to the operational defects of the logical circuits constituting them; that is to say, they do not present any shunts, but only open faults in the case of failure of a logical circuit.

Another advantage of the device according to the invention is that the characteristics of the filters being fixed by the coefficients $B_1$ and $B_2$, all that is necessary for changing the characteristics (pass band, attenuation) of a filter, is to modify the coefficients, which may be done simply by modifying the matrix of the store of the coefficients.

Furthermore, the invention will be well understood and other features and advantages will appear from the detailed description, which will be given with reference to the figure of the accompanying drawings.

FIG. 1 gives a descriptive representation of the finite difference equation.

Figure 2:
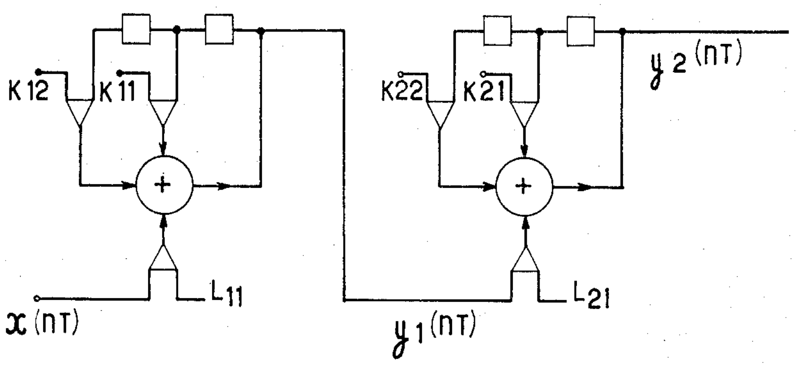

FIG. 2 gives a descriptive representation of the finite difference equation in "series" combination of two equations having differences of 1st or 2nd order.

Figure 3:
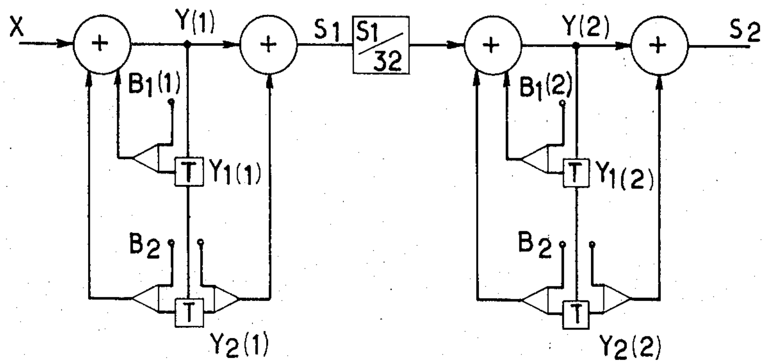

FIG. 3 gives a symbolic representation of a type of filter selected for the frequency receiver according to the invention.

Figure 4:
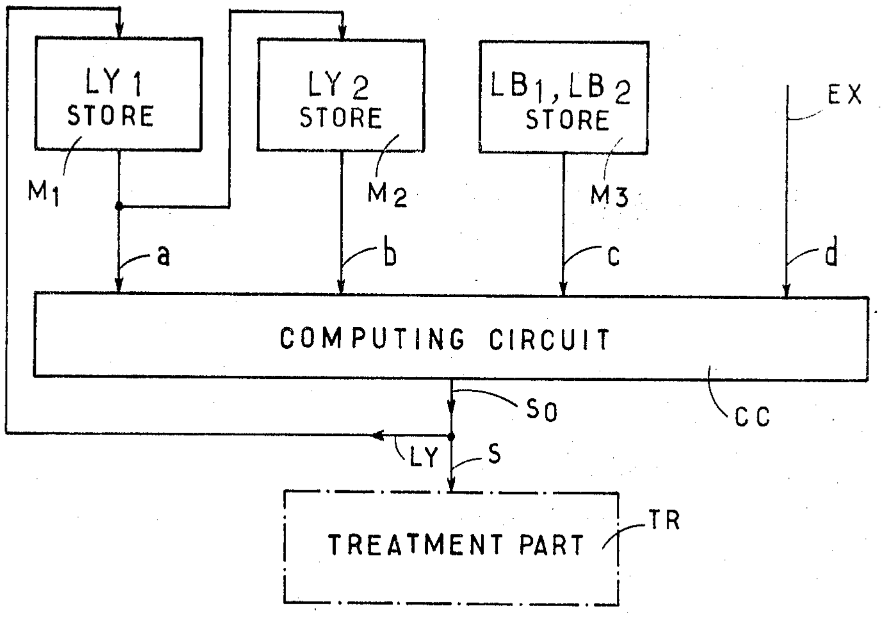

FIG. 4 shows a general diagram of a frequency receiver according to the invention.

Figure 5:
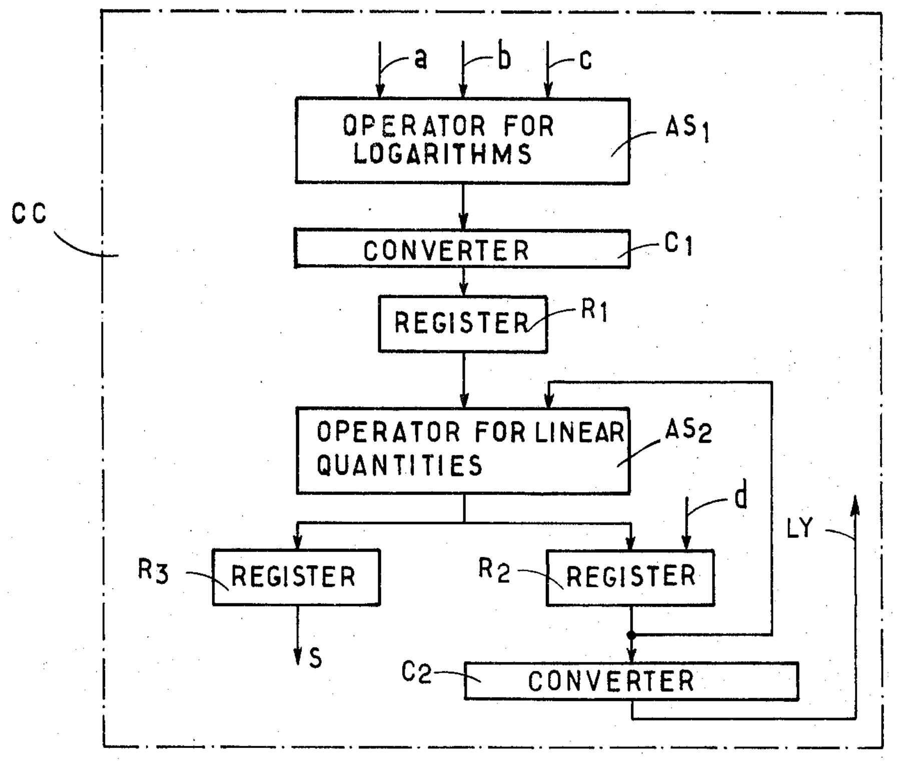

FIG. 5 gives a detailed diagram of a computing circuit according to the invention.

Figure 6:
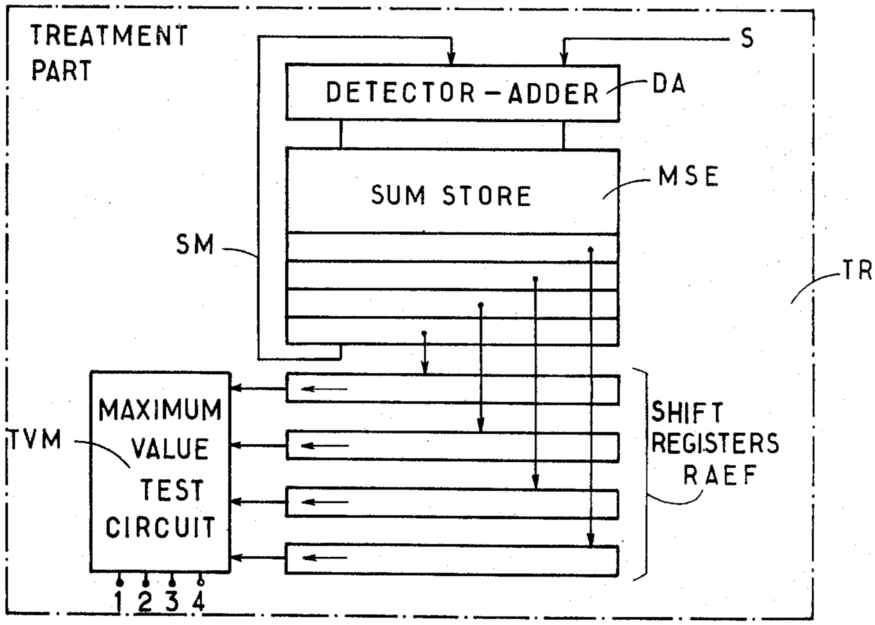

FIG. 6 gives a detailed diagram of the "treatment" part of the device according to the invention.

Figure 7:
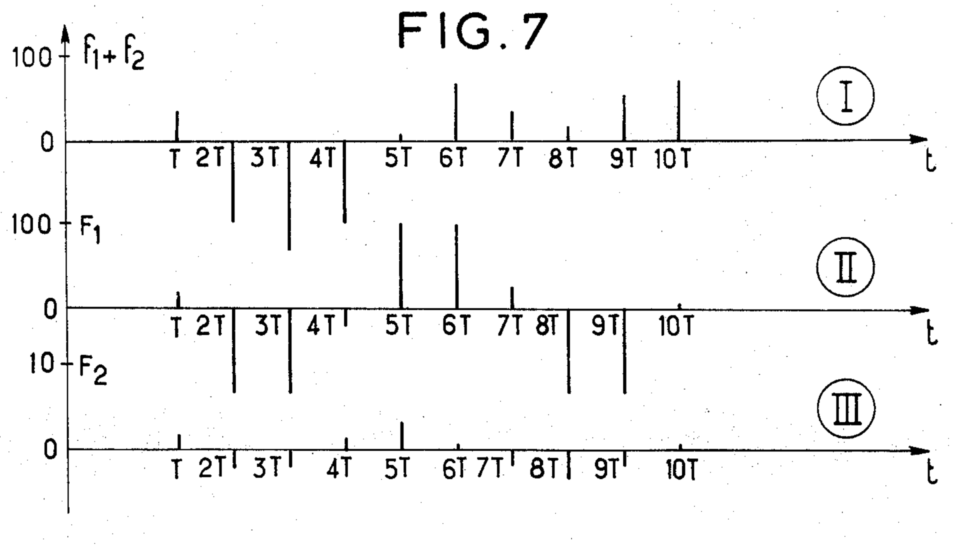

FIG. 7 offers a comparison of the output signals of two filters receiving the same input signal.

Figure 8:
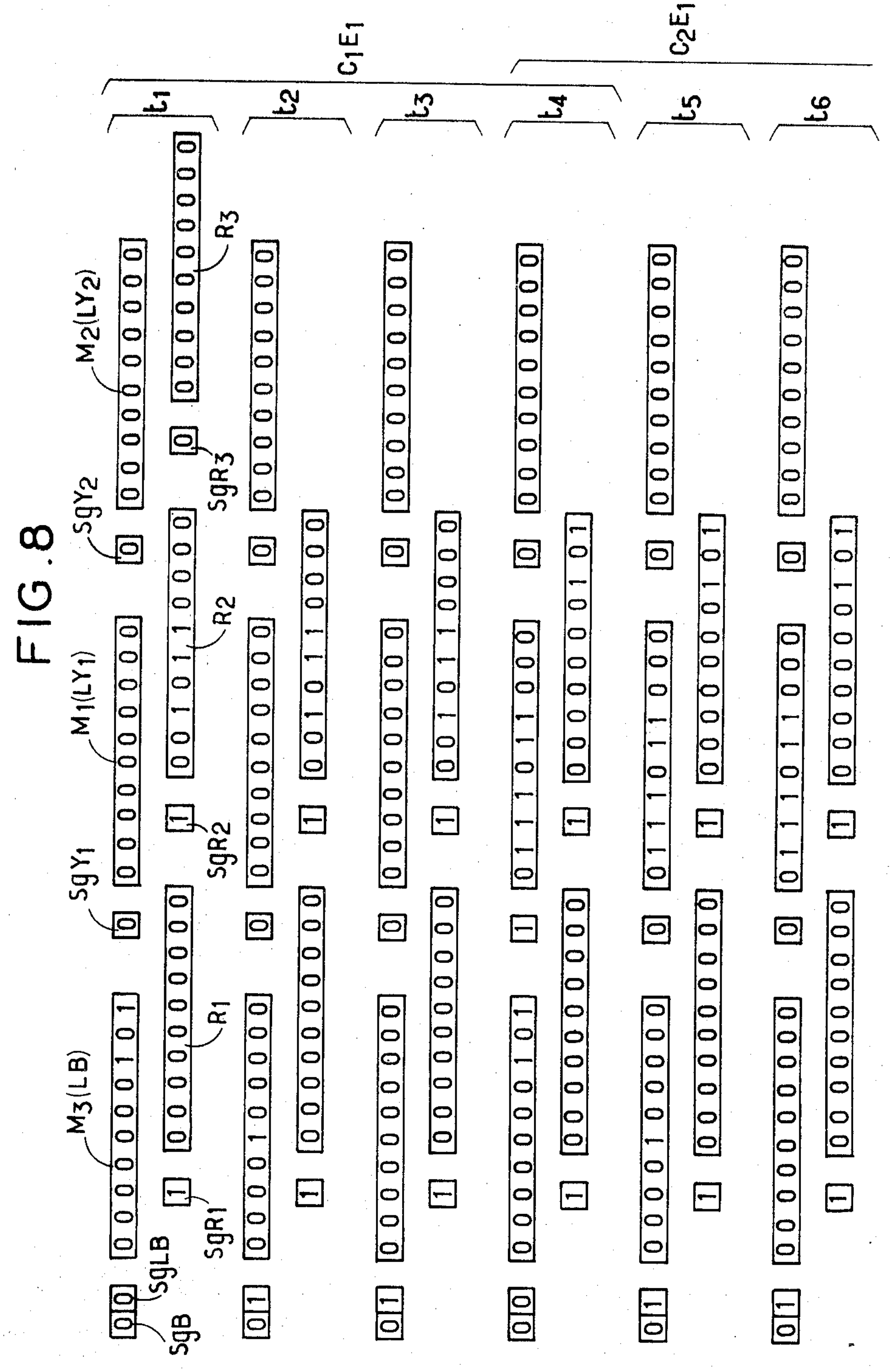

FIG. 8 gives a coded example of the operation of a two-cell filter on a first input sample.

Figure 9:
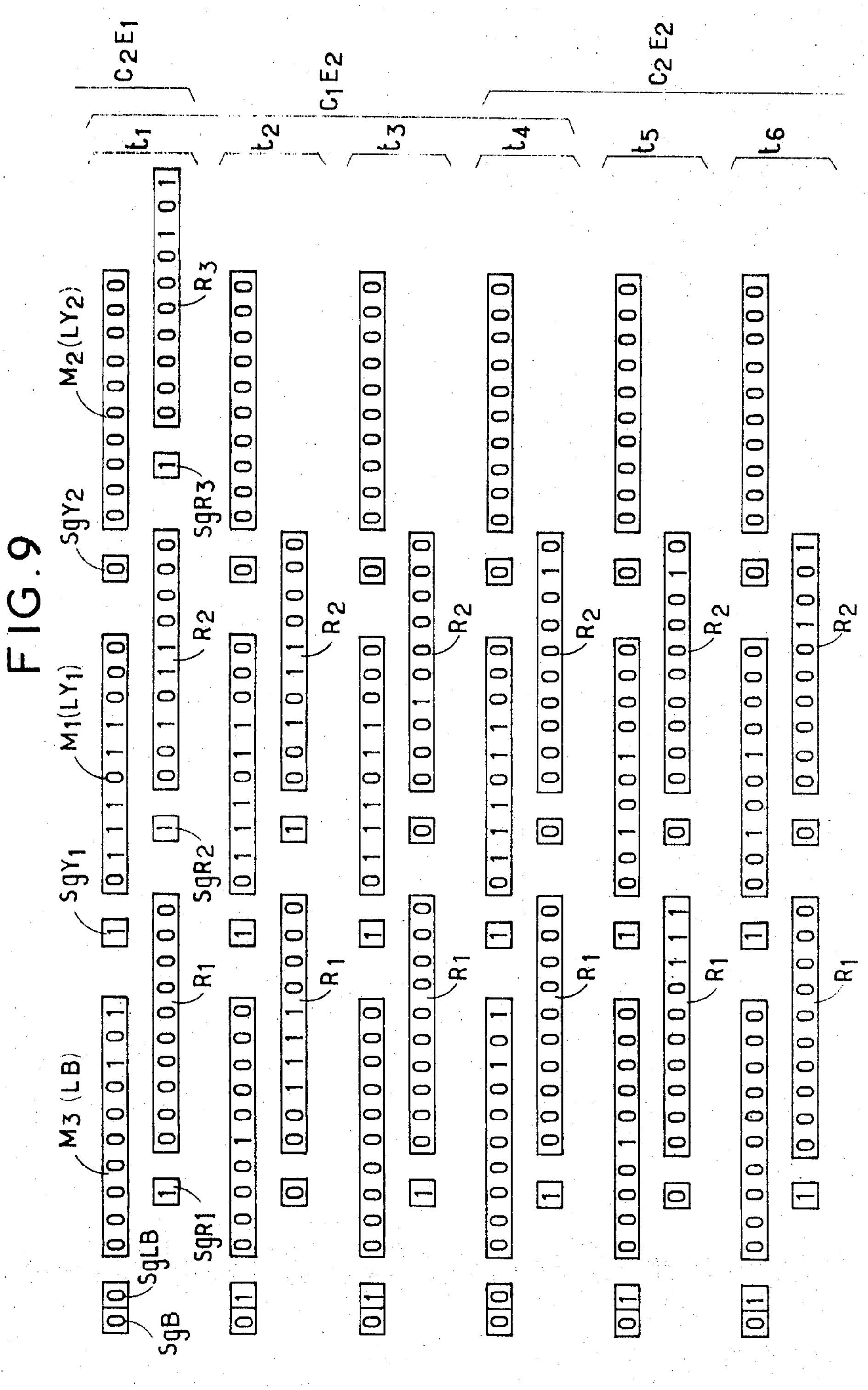

FIG. 9 gives a coded example of the operation of the same two-cell filter on a second input sample.

To relieve the reader of the necessity of referring to other documents, a summary of the theory of numerical filters is given in the following.

It is known that linear continuous filters are defined by a linear differential equation, that is to say, if the excitation of the filter is $e(t)$ and the response $r(t)$, the relation between $e(t)$ and $r(t)$ is given in the form of a linear differential equation (the variable $t$ is the time). When the Laplace transform is used, $s$, complex frequency, is the variable; the excitation transform is E(s), the response transform is $R(s)$. The relation between $E(s)$ and $R(s)$ is algebraic and is written:

$$R(s) = E(s) \times H(s)$$

$H(s)$ is called the transfer function of the filter or again the function of the system.

The problem of the definition of continuous filters is to determine the function $H(s)$ which gives the desired response to a known excitation and which may be realized physically.

If the theory of continuous linear filters is based on the theory of linear differential equations, the theory of numerical linear filters is based on the theory of finite difference equations. And, just as the LAPLACE transformation is used for solving linear differential equations, the Z transformation is used for solving finite difference equations describing the numerical linear filters.

A linear, finite difference equation of order m may be written:

$$y(nT) = \sum_{i=0}^{r} L_i x(nT - iT) - \sum_{i=1}^{m} K_i y(nT - iT) \qquad (1)$$

This form (1) indicates the iterative nature of the difference equation; given the $m$ preceding values of the output $y$ and the $(r + 1)$ last values of the input $x$, the new value of the output $y$ is calculated by means of the relationship (1). From the physical point of view, the input quantities $x$ are samples of the continuous signal, and the numerical filtering in real time consists in effecting the iteration (1) each time a new sample appears, that is to say, at each sampling period T.

The definition of a numerical filter consists in determining the constants $K_i$ and $L_i$ which satisfy the required filtering conditions.

FIG. 1 gives a descriptive representation of the relationship (1). The closed contour $$\sum$$

is the algebraic sum of the sum $$\sum_{i=0}^{r} L_i x(nT - iT)$$

represented by the top part of the figure and of the sum $$\sum_{i=t}^{m} K_i y(nT - iT)$$

represented by the bottom part of the figure. The elements multiplied by $L_i$ and $K_i$ are represented by triangles giving the elementary results at each sampling period, the sum of which forms the closed contour.

In practice, instead of equations of order $m$, "series," "parallel" and "series-parallel" combinations of 1st or 2nd order difference equations are used. For example, the two equations:

$$\begin{cases} y_1(nT) = K_{11} y_1(nT - T) + K_{12} y_1(nT - 2T) + L_{11} x(nT) \\ y_2(nT) = K_{21} y_2(nT - T) + K_{22} y_2(nT - 2T) + L_{21} y_1(nT) \end{cases} \qquad (2)$$

constitute a "series" combination, in which the output $y_1$ of the first equation is used as input of the second equation, as shown in FIG. 2. In this figure, the triangles are always multiplying elements, and the circular contours adding elements.

The equations (2) may be written in the form of a single equation having finite differences of order 4, but the fundamental properties of the numerical filters are easier to understand on structures of the type of FIG. 2.

To pass to the Z transformation, it is assumed that the input samples $x(nT)$ and output samples $y(nT)$ are zero for $n < 0$. The Z transformation of the sequence of $x(nT)$A)S IS WRITTEN:

$$X(z)=\sum_{n=0}^{\infty}x(mT)z^{-n} \qquad (3)$$

In practice, for certain series, there is a condensed equivalent expression of the infinite series. For example, the Z transformation of the series of $x(nT)$ such that $x(nT)=0$ for $n < 0$ and $x(nT)=1$ for $n$ 0 is:

$$X(z)=\sum_{n=0}^{\infty}z^{-n}=\frac{1}{1-z^{-1}}$$

The transformation variable z is complex and $X(z)$ is a function of this complex variable.

The Z transformation of a convergent series defines this series perfectly. By multiplying the two terms of (3) by $z^{n-1}$ and integrating over a closed contour (C) containing the origin and the singular points (poles) of $X(z)$ we obtain (theorem of remainders):

$$x(nT)=\frac{1}{2\pi j}\int(C)X(z)z^{n-1}dz \text{ with } j=\sqrt{-1} \qquad (4)$$

The inverse Z transformation therefore defines explicitly the series $x(nT)$ associated with a function $X(z)$. For certain series, the closed integration contour may be the circle of radius 1 and center 0.

We shall now use the Z transformation for obtaining an explicit solution of the linear difference equation (1) of order $m$. We first of all write the relationship (1) in the new form:

$$\sum_{i=0}^{m}K_i y(nT-iT)=\sum_{i=0}^{r}L_i x(nT-iT) \qquad (5)$$

Taking the Z transformation of (5), we have:

$$\sum_{i=0}^{m}K_i\sum_{n=0}y(nT-iT)z^{-n}=\sum_{i=0}^{r}L_i\sum_{n=0}x(nT-iT)_z \qquad (6)$$

Noting that the Z transformation of a delayed series of i samples is equal to the Z transformation of the initial series multiplied by $z^{-i}$, the relationship (6) becomes:

$$\begin{cases} Y(z)\sum_{i=0}^{m}K_i z^{-i}=X(z)\sum_{i=0}^{r}L_i z^{-i} \\ Y(z)=X(z)\dfrac{\sum_{i=0}^{r}L_i z^{-i}}{\sum_{i=0}^{m}K_i z^{-i}}=X(z)\cdot H(z) \end{cases} \qquad (7)$$

Thus, the Z transformation of the output y is given as the product of the Z transformation of the input x and the function $H(z)$, characteristic of the system and analogous to a transfer function; $H(z)$ is a rational fraction in $z^{-1}$ and is a function of the constant coefficients of the finite difference equation. Taking the inverse Z transformation of $Y(z)$, $y(nT)$ is defined by a relationship of type (4).

If we take as input signal $$x(nT)=1 \text{ for } n=0$$

$$x(nT)=0 \text{ for } n\neq 0$$

that is to say, what may be called unit stage, then, in (7), $X(z)=1$ and $Y(z)=H(z)$, and taking the inverse Z transformation, it will be seen that the inverse transformation of $H(z)$ is the response of the system to the signal $x(nT)$ defined earlier, that is to say, as it were, at unit stage.

It may be seen now how the function $H(z)$ permits characterization of the frequency selectivity of the system it defines. Assuming that the input signal is the complex signal:

$$x(nT)=e^{jn\omega T} \qquad (8)$$

The solution of equation (5), that is to say the output signal, may be written in the form:

$$y(nT)=F(e^{j\omega T})\,e^{jn\omega T} \qquad (9)$$

Substituting (8) and (9) in (5) gives:

$$F(e^{j\omega T})=\frac{\sum_{i=0}^{r}L_i e^{-ji\omega T}}{\sum_{i=0}^{m}K_i e^{-ji\omega T}}=H(e^{j\omega T})$$

The response to a sampled sinusoidal input signal may readily be derived from this expression.

It is now possible to examine the definition techniques of numerical filters, one known as pulse invariance technique and the other as frequency sampling technique, the former being best adapted to the definition of the resonators and the latter to the definition of banks of pass-band filters.

a. Pulse invariance technique.

It is accepted that a numerical filter having a pulse response equal to the sampled pulse response of a given continuous filter may be defined starting from the following agreement:

$$Y(s)=\sum_{i=1}^{m}\frac{Ai}{s+si}=\sum_{i=1}^{m}\frac{Ai}{1-e^{-siT}z^{-1}}=H(z)$$

Thus, most resonant circuits have, as transfer function, one of the two following forms:

$$\frac{s+a}{(s+a)^2+b^2} \text{ and } \frac{b}{(s+a)^2+b^2}$$

leading to the following agreements:

$$\frac{s+a}{(s+a)^2+b^2}=>\frac{1-e^{-aT}\cdot\cos(bT)\cdot z^{-1}}{1-2e^{-aT}\cdot\cos(bT)\cdot z^{-1}+e^{-2aT}\cdot z^{-2}}$$

$$\frac{b}{(s+a)^2+b^2}=>\frac{e^{-aT}\cdot\sin(bT)z^{-1}}{1-2e^{-aT}\cdot\cos(bT)\cdot z^{-1}+e^{-2aT}z^{-2}}$$

b. Frequency sampling technique.

The difference equation $$y(nT)=x(nT)-x(nT-mT) \qquad (10)$$

has as transfer function in z $$H(z)=1-z^{-m}$$

which has m zeros regularly spaced on unit circle at the points:

$$z_k = e^{j2\pi k/m} \; k = 0, 1, \ldots m-1$$

If, in relationship (10), the subtraction is replaced by an addition, the transfer function becomes $1 + z^{-m}$ which has m zeros regularly spaced in the unit circle at the points:

$$z_k = e^{j2\pi(K+1/2)/m} \; k = 0, 1, \ldots m-1$$

The amplitude response curves of these filters, as a function of frequency, have a period of 2/m radians, and these filters are generally given the name of comb filters; they are sometimes used in the production of special types of filters, as will be shown later. For example, a simple resonator is connected in series with a comb filter; for the resonator, poles for $z = re^{\pm j\omega_0 T}$ and having no zero are taken; its transfer function in $z$ is:

$$H(z) = \frac{1}{1 - 2r(\cos \omega_0 T) z^{-1} + r^2 z^{-2}}$$

It is assumed that $r = 1$, that is to say, the poles are on the unit circle, and the angle $\omega_r$ of a pole of the resonator is such that the pole coincides with a zero of the comb filter.

Now $\omega_r = 2\pi k/m$ for the function $1 - z^{-m}$ $\omega_r = 2\pi(k+½)/m$ for the function $1 + z^{-m}$ The poles of the resonator therefore annul the $k^{th}$ zero of the comb filter and its conjugate. Henceforward, we shall call "elementary filter" the resonator used for annulling the $k^{th}$ zero of the comb filter. An elementary filter and a comb filter in cascade form a composite filter having the following properties:

the pulse response has a finite duration $m$T, the amplitude of the response as a function of the frequency is:

$$H(e^{j\omega T}) = \left| \frac{\sin m\omega T/2}{\cos \omega T - \cos \omega_r T} \right|$$

which is zero for any $\omega$ which is zero of the comb filter except for $\omega_r$.

the phase as a function of frequency is quite linear except at the discontinuity points where the phase variations are $\pi$ radians.

the phase difference between two composite filters of resonance frequency $\omega_r$ and $\omega_{r+1}$ is $\pi$ for $\omega_r < \omega < \omega_{r+1}$, and zero outside these limits.

the amplitude of any one of the composite filters is zero at the resonance frequencies of all the other composite filters.

The properties show that it is possible to obtain a predetermined amplitude response by adding the weighted outputs of the unit formed of a comb filter and associated elementary filters, in the same way that a limited band function of the time may be formed from weighted sums of the delayed functions sin $t/t$.

It is this characteristic which is called "frequency sampling."

A frequency response function having a sufficiently narrow band is sampled at regularly spaced points at frequencies in radians.

$$\omega_k = \frac{2\pi k}{m} \text{ or } \omega_k = \frac{2(k+½)}{m}, \; k = 0, 1 \; . \; . \; . \; m-1$$

depending on the type of filter used. Let $\omega_k$ be the amplitude of the sample at the frequency $\omega_k$ T; an elementary filter of resonance frequency $\omega_k$ in series with a comb filter of delay m$T$ and gain $\omega_k \sin \omega_k$T are used for producing an elementary frequency response of $\omega_k$ at the frequency $\omega_k$T and zero at the other sampling frequencies.

Since the phases at resonance of the consecutive elementary filters differ by $\pi$, the gains of the odd-numbered elementary filters have to be multiplied by −1.

The input signal of the filter is applied to the input of the comb filter which is shared between all the elementary filters, then multiplied by the gains of the filters and by −1 for the odd filters. The outputs of all the elementary filters are added together to give the output signal of the filter in question. This "resultant" filter has a pulse response of duration mT and a frequency response of linear phase; its amplitude response agrees with the specifications at the sampling frequencies and connects the different sampling points without discontinuity. A large variety of filters may be constructed on the basis of this technique.

For practical applications, it is well to take the following considerations into account: The poles of the resonant circuits of the elementary filters cannot quite annul the zeros of the comb filter because of quantization. It is therefore advisable to displace the zeros and the poles slightly to the interior of the unit circle on a radius of the order of $e^{-aT} = 1 - 2^{-26}$. On the circle of radius $e^{-aT}$, the transfer functions become:

for the comb filter $H(z) = 1 - e^{-maT} z^{-m}$ for the elementary filter $H(z)$ $$= \frac{1}{1 - 2e^{-aT}(\cos \omega_k T) z^{-1} + e^{-2aT} z^{-2}}$$

FIG. 3 gives a symbolic representation of a type of filter selected for the construction of the frequency receiver according to the invention; in this figure, the squares designated T represent the circuits of sampling period delay, the circles (+) represent the summation circuits and the triangles the multiplication circuits.

These filters are formed of two cells of resonators having slightly offset resonance frequencies. The first cell receives the sample X as an input, that is to say, the coded multifrequency signal; the second cell receives as input the output quantity, divided by $g$ (gain of the first cell), of the first cell.

The difference equations defining these filters for the first cell are $Y_{(1)} = X - B_{11} Y_{1(1)} - B_{12} Y_{2(1)}$ $S_1 = Y_{(1)} - Y_{2(1)}$ and for the second cell:

$Y_{(2)} = S_{1/g} - B_{21} Y_{1(2)} - B_{22} Y_{2(2)}$ $S_2 = Y_{(2)} - Y_{2(2)}$ with $Y = Y(nT)$ $Y_1 = Y_1(nT - T)$ $Y_2 = Y_2(nT - 2T)$;

the indices (1) and (2) indicate that the expressions relate respectively to cells (1) and (2).

FIG. 4, representing the general circuit diagram of a frequency receiver according to the invention, shows a "filtering" part formed of a computing circuit CC and accessory stores $M_1$, $M_2$ and $M_3$ and a "treatment" part TR.

The operations to be performed by the computing circuit are:

$Y = X - B_2 Y_2 - B_1 Y_1$ $S - Y - Y_2$ where:

$X$ is the filter input sample arriving every 125 $\mu s$, $S$ is the output sample of the filter, leaving every 125 $\mu s$, $B_1$ and $B_2$ are constant factors, $Y_1$ and $Y_2$ are intermediate results.

The logarithm to base 2 of $Y_1$ is registered in the store $M_1$; the logarithm to base 2 of $Y_2$ is registered in the store $M_2$; the logarithms to base 2 of the factors $B_1$ and $B_2$ are registered in the store $M_3$. At the output SO of the computing circuit CC there appears, offset in time, either the result $Y$, or the output sample $S$. The stores $M_1$, $M_2$, $M_3$ insert their information into the computing circuit CC respectively by the inputs $a$, $b$ and $c$; the input EX of the input samples X in the computing circuit is operated by $d$.

FIG. 5 shows in detail in its constituent elements the computing circuit CC which is composed of a block $AS_1$ for the addition and subtraction of logarithms and a block $AS_2$ for the addition and subtraction of linear quantities. The inputs of the stores $M_1$, $M_2$ and $M_3$ are effected on the block $AS_1$ respectively via $a$, $b$ and $c$. The quantities $Y_1$, $Y_2$, $B_1$ and $B_2$ being registered in logarithmic form, the multiplications are replaced by additions of logarithms. On the other hand, normal additions and subtractions are performed on linear quantities. It is therefore necessary to have a converter $C_1$ for converting logarithmic quantities into linear quantities, and a converter $C_2$ for converting linear quantities into logarithmic quantities. The register $R_1$ registers successively the products $B_2Y_2$, $B_1Y_1$ and the quantity $Y_2$; the register $R_2$ registers successively the quantity $X$, then $X-B_2Y_2$, then the quantity Y; finally, the register $R_3$ registers the quantity S, output sample. The quantity S is then directed to the treatment part TR (FIG. 6).

The operation of the computing device is controlled by a pulse distributor or time base. The treatment of a filter cell is carried out in four elementary times $t_1$ to $t_4$; during each elementary time, a certain number of operations are performed, several of which commence simultaneously. On the other hand, due to the fact that the frequency receiver operates continuously, it is necessary for the time $t_1$ to overlap the last time $t'_4$ of the preceding cycle, and for the time $t_4$ to overlap the first time $t''_1$ of the succeeding cycle.

Thus, at the time $t_1$, for the cycle then proceeding, the addition of the logarithms $LB_2 + LY_2$ and the inscription $X$ of the input sample in the register $R_2$ commence simultaneously, then the logarithms $LB_2$ and $LY_2$ are converted into linear quantities and the inscription $B_2Y_2$ is effected in the register $R_1$. For the time $t_4$ of the preceding cycle which is superimposed on the time $t_1$ of the cycle then proceeding, the subtraction $S=Y-Y_2$ of linear quantities and conversion from linear to logarithm of the quantity $Y$ commence; then the quantity S is inscribed in the register $R_3$ and the quantity LY is inscribed in the store of the $LY_1$'s.

The time $t_1$ may therefore be summarized (Table I). The arrows $f$ indicate that the operations commence simultaneously:

TABLE I

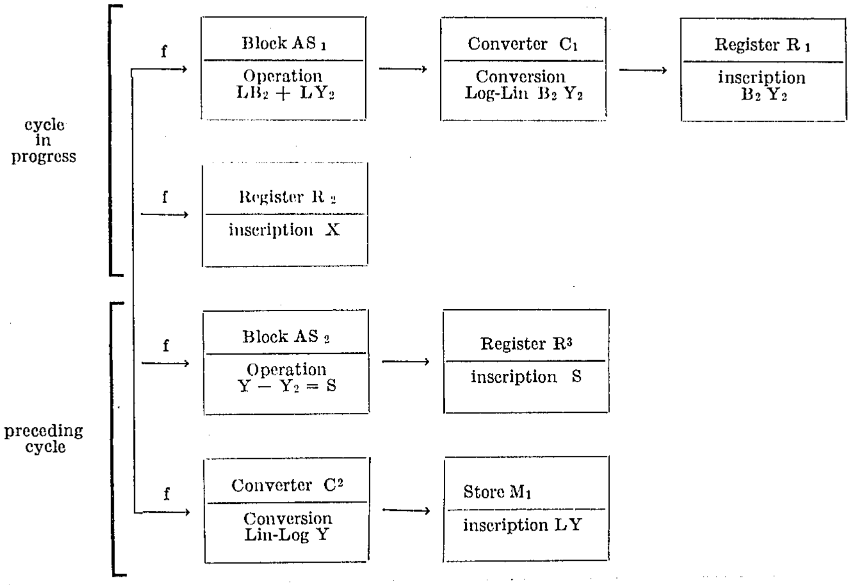

At the time $t_2$, for the cycle in progress, the addition of the logarithms $LB_1 + LY_1$ and the subtraction of the linear quantities $X - B_2Y_2$ commence simultaneously; then the logarithms $LB_1 + LY_1$ are converted into linear quantities and the quantity $B_1Y_1$ is inscribed in the register $R_1$; in parallel, the quantity $X-B_2Y_2$ is inscribed in the register $R_2$.

The time $t_2$ may be summaried thus (Table II):

TABLE II

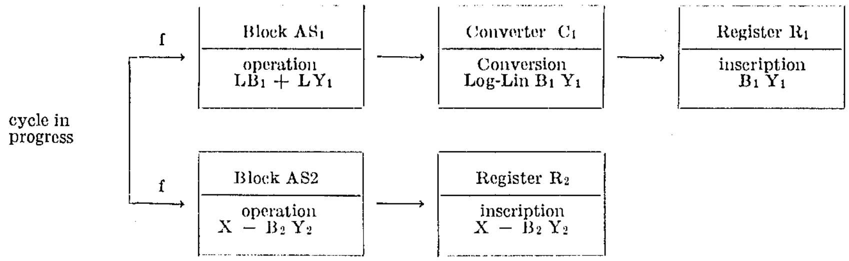

At the time $t_3$, three operations commence simultaneously: (1) the addition of the logarithm $LY_2$ in the block $AS_1$; (2) the addition and subtraction of the quantities $X-B_2Y_2-B_1Y_1=Y$ in the block $AS_2$; (3) inscription of $LY_1$ in the store $M_2$. The first operation proceeds by conversion of $LY_2$ to linear, then by inscription of $Y_2$ in the register $R_1$; the second operation continues by the inscription of $Y$ in the register $R_2$.

The time $t_3$ may be summarized as follows (Table III):

TABLE III

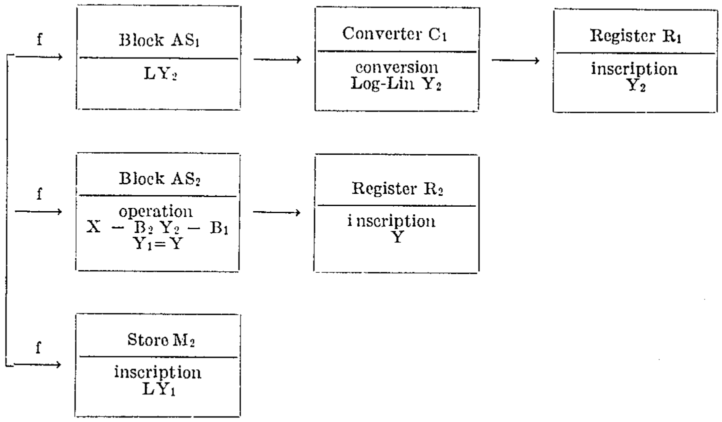

Superimposed on the time $t_4$ of the cycle in progress is the time $t''_1$ of the next cycle; at the start of this time, four operations commence simultaneously, two for the cycle in progress and two for the next cycle. For the cycle in progress, there is the linear addition $S=Y-Y_2$ and the conversion to logarithm of the quantity $Y$; then $S$ is inscribed in the register $R_3$ and the quantity $LY$ is stored in $M_1$. For the next cycle, there is the addition of logarithms $LB_2+LY_2$ and the inscription of $X$ in the register $R_2$. Then the conversion to linear of $B_2Y_2$ is operated and this quantity is inscribed in the register $R_2$.

The time $t_4$ may be summarized as follows (Table IV):

TABLE IV

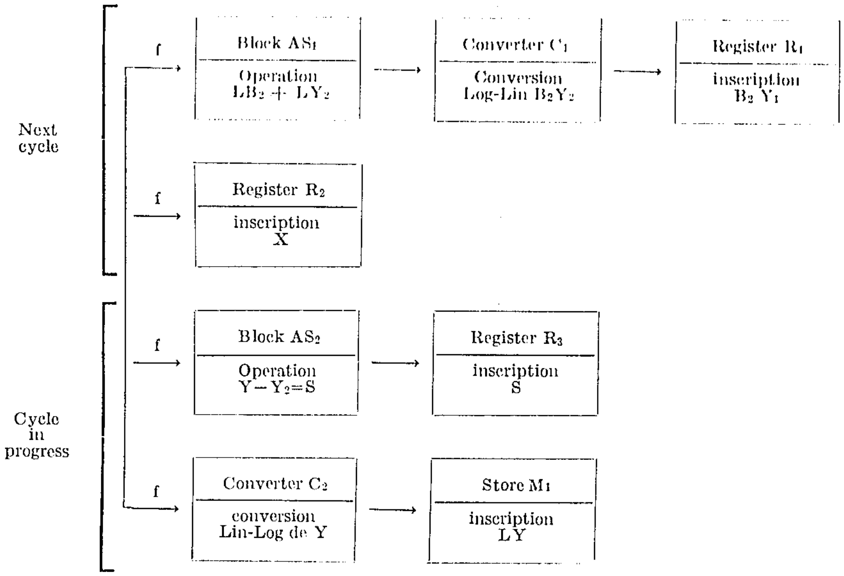

FIG. 6 shows in detail in its constituent elements the treatment part TR for the output signals of the filters. Detection of the signal by amplitude rectification and its integration by amplitude summation by means of the detector-adder device DA are performed in the treatment part. Amplitude summation is carried out on eight successive samples and a sample sum store MSE contains the "sum" results of each filter of the receiver.

It is assumed that the diagram of FIG. 6 relates more particularly to the case of a frequency receiver of subscriber signalling of the type $1/P+1/Q$ (one among $P+1$ among $Q$). It is known in fact that the SOCOTEL code is the following:

1. Multifrequency code utilizable on an inter-exchange circuit.

There are five code frequencies used for the digits (called code 0–1–2–4–7) to which it is necessary to add a check frequency $f_c$ and a signalling frequency $f_{11}$.

| | |
|---|---|
| $F_0=700$ c/s | $F_C=1900$ c/s |
| $F_1=900$ c/s | $F_{11}=1700$ c/s |
| $F_2=1100$ c/s | |
| $F_4=1300$ c/s | |
| $F_7=1500$ c/s | |

This code is called "two among five", that is to say that a digit is coded by the superposition of two frequencies.

Thus

| | |
|---|---|
| 1 —700 + 900 | 6 —1100 + 1300 |
| 2 —700 + 1100 | 7 —700 + 1500 |
| 3 —900 + 1100 | 8 —900 + 1500 |
| 4 —700 + 1300 | 9 —1100 + 1500 |
| 5 —900 + 1300 | 0 —1300 + 1500 |

2. Keyboard code utilizable between the subscriber and his connected exchange; this is a code 1/P + 1/Q with P=3 and Q=4

| | |
|---|---|
| $P_1 = 1500$ c/s | $Q_1 = 2200$ c/s |
| $P_2 = 1650$ c/s | $Q_2 = 2350$ c/s |
| $P_3 = 1800$ c/s | $Q_3 = 2500$ c/s |
| | $Q_4 = 2650$ c/s |

A digit is coded by the superposition of two frequencies, one of which belongs to the group P and the other to the group Q.

Thus

| | | | |
|---|---|---|---|
| 1 — $P_1+Q_1$ | 4 → $P_1+Q_2$ | 7 → $P_1+Q_3$ | 10 → $P_1+Q_4$ |
| 2 — $P_2+Q_1$ | 5 → $P_2+Q_2$ | 8 → $P_2+Q_3$ | 11 → $P_2+Q_4$ |
| 3 — $P_3+Q_1$ | 6 → $P_3+Q_2$ | 9 → $P_3+Q_3$ | 12 → $P_3+Q_4$ |

The store MSE (FIG. 6) is a circulation (series-parallel) store comprising one word of 12 bits per filter of the frequency receiver, that is to say seven words for a receiver of seven filters for the case considered. This shift store advances in synchronism with the computing instants relative to each of the filters. During the treatment of a filter, the word of the store MSE is appears at the output of the store and therefore at one of the inputs of the adder DA by the wire SM; at the end of the calculations relating to the filter, the output sample of the filter is inscribed in the register $R_3$ (see FIG. 5), whose output S is connected to the second input of the adder DA. The latter has its outputs connected to the shift store MSE. Every eight sampling periods, that is to say after having summed the amplitudes of 8 samples, analysis of the energies in each filter of the receiver is made.

The filter energy analysis circuits consist of four shift registers RAEF receiving on command, in parallel and at the same instant, the contents of the first four words starting from the output of the store MSE. After the posting of these registers, they are shifted, heavily weighted at the front (in the direction of the arrows), and the outputs of these four registers enter the maximum value test circuit TVM.

To define the filter having maximum energy, it is sufficient to test which of the four shift registers first presents a "1" at its output (since these registers are shifted heavily weighted at the front). This single test, however, is not sufficient; in fact, when a pure frequency is present in a filter of the receiver, the ratio between the energy in this filter and the energy in the adjacent filters is at least 10 decibels. Therefore, we decide that one frequency is present in a filter (out of four or three, depending on whether it is a matter of group *Q* or group *P*) only if the ratio between the filter which has the heaviest weight and the energy in each of the other filters is at least 8.

The maximum value test circuit TVM has four outputs, only one of which is active if the test is valid and indicates the number of the filter of the group *P* (three frequencies) or group *Q* (four frequencies) which has the maximum value, that is to say, indicates the frequency present in the group.

After having determined successively the frequency present in the group *P*, then in the group *Q*, the code $1/P + 1/Q$ is binary coded at four bits and transmitted to the output of the frequency receiver.

So that the result at the output of the frequency receiver will not be zero, it is necessary that there should be one frequency and only one present in each of the groups *P* and *Q*; it is then said that the result is coherent.

FIG. 7 gives a comparison of the output signals of two filters receiving the same input signal.

It is assumed that the input signal X in the frequency receiver is formed of the sum of two sinusoidal signals of respective frequencies $f_1 = 900$ c/s and $f_2 = 1300$ c/s, but having the same amplitude. Also assumed are two adjacent filters $F_1$ and $F_2$ such that the filter $F_1$ is formed of a cell centered on 1,300 c/s and filter $F_2$ is formed of a cell centered on 1,100 c/s.

FIG. 7 shows three graphs 7—I, 7—II and 7—III of amplitude as a function of the time for sampling instants spaced by the duration T of a sampling period.

The graph 7–I gives the amplitude of the input signal *X* formed of $f_1 + f_2$ at 10 successive instants spaced by T.

The graph 7–II gives the amplitude of the output signals S of the filter $F_1$ centered on 1,300 c/s, and which therefore receives at the maximum the signals $f_2$ of 1,300 c/s.

The graph 7-III gives the amplitude of the output signals of the filter $F_2$ centered on 1,100 c/s, and which therefore receives neither the frequencies $f_1$ centered on 900 c/s nor the frequencies $f_2$ centered on 1,300 c/s. It will be observed that despite an amplitude scale of the output signals of $F_2$ 10 times greater than that of $F_1$ or of $f_1 + f_2$, the output signals of $F_2$ are very weak. The output energies of these two adjacent filters are in a ratio of about 30 decibels and, consequently, the signal detected and to be retained is the signal $f_2$ alone, collected at the output of $F_1$.

An actual operational example of filtering by the computing device, FIGS. 4 and 5, will now be given with reference to FIGS. 8 and 9. The operation of a filter all in four elementary times $t_1$ to $t_4$ has already been described; actually a filter is composed of two cells having slightly offset resonance frequencies and is treated in six elementary times since we have seen that, during the fourth time of the treatment of a cell, the operations of the first time of the next cell are also treated. In the treatment of a two-cell filter, therefore, the first time is utilized for treating the last operations of the second cell of the preceding cycle, the second and third times are utilized for treating solely the first cell of the cycle in progress, the fourth time terminates the treatment of the first cell and commences the operations of the second cell, the fifth and sixth cells are utilized solely for the second cell of the cycle in progress, and the end of the treatment of this second cell will be effected in the first treatment time of the first cell of the next cycle; there is therefore overlapping in the first time $t_1$ and in the fourth time $t_4$; in the first time, overlapping occurs over two adjacent cycles, in the 4th time overlapping occurs on the two cells of the same cycle. This is shown in FIGS. 8 and 9, where $C_1E_1$ represents the first treatment cell of the first sample, $C_2E_1$ represents the second treatment cell of the first sample, $C_1E_2$ represents the first treatment cell of the second sample, $C_2E_2$ represents the second treatment cell of the second sample, etc.; the treatment of $C_1E_1$ occurs in the times $t_1$ to $t_4$, the treatment of $C_2E_1$ occurs in the times $t_4$ to $t_6$ of the 1st cycle and in the time $t_1$ of the 2nd cycle (FIG. 9); likewise, the treatment of $C_1E_2$ occurs in the times $t_1$ to $t_4$ of the second cycle and the treatment of $C_2E_2$ occurs in the times $t_4$ to $t_6$ of the second cycle and in the time $t_1$ (not shown) of the third cycle, etc., a complete cycle corresponding to the treatment of one sample. By way of example, the numerical operation of a two-cell filter will now be described; to facilitate the computations, two identical cells, that is to say having the same resonance frequency, will be assumed; the coefficient of the difference equations have the value:

$B_{11} = B_{21} = 1.414 = B_1$
$B_{12} B_{22} = 0.973 = B_2$

We thus the following difference equations:

$Y_{(1)} = X - 1.414\ Y_{1(1)} - 0.973\ Y_{2(1)}$
$S_{(1)} = Y_{(1)} - Y_{2(1)}$
$Y_{(2)} = S_{1/32} - 1.414\ Y_{1(2)} - 0.973\ Y_{2(2)}$
$S_2 = Y_{(2)} - Y_{2(2)}$

The bracketed subscripts refer to the cells 1 or 2 of the filter. To facilitate matters, input samples, which are constant in time, are assumed, for example $X = +176$ ($X$ capable of varying from 0 to 1,000).

In binary form $|X| = 0010110000$ with Sg (sign) $X = 1$, the sign of $X$ being assumed equal to 1 if $X$ is positive and equal to 0 if $X$ is negative.

The coefficients are expressed as logarithms to the base 2.

(1) $-B_1 = -414$

The logarithm of $B_1$ expressed in binary form is $|LB_1| = 0000, 100000$ with $Sg\ LB_1 = 1$ and $Sg\ B_1 = 0$ ($B_1$ being greater than 1 has a positive logarithm).

(2) $-B_2 = -0.973$

The logarithm of $B_2$ expressed in binary form is $LB_2 = 0000, 000101$ with $Sg\ LB_2 = 0$ and $Sg\ B_2 = 0$ ($B_2$ being less than 1 has a negative logarithm).

(3) $-1$

The logarithm of 1 is $L_1 = 0000, 000000$ with $Sg\ L_1 = 1$ and $Sg\ (-1) = 0$.

FIGS. 8 and 9 give in tabular form the binary values of $LB_1$ and $LB_2$ registered in the store $M_3$, $LY_1$ registered in $M_1$ and $LY_2$ registered in $M_2$, as well as the value of their sign; there is also shown the contents of each of the registers $R_1$, $R_2$ and $R_3$ of FIG. 5 in the course of the six elementary treatment times of the filter for two successive samples of the input signal, FIG. 8 giving the treatment of the first input sample and FIG. 9 the treatment of the second input sample. For each elementary time $t_1$, $t_2$ . . . therefore, the modified or non-modified state of the stores $M_1$, $M_2$ and $M_3$, as well as that of the registers $R_1$ to $R_3$ are again shown; $R_3$, however, since it intervenes only at the time $t_1$, is indicated only for this time alone.

At the commencement of the operations, the registers $R_1$, $R_2$ and $R_3$ are at zero, as are also the stores $M_1$ for $LY_1$, $M_2$ for $LY_2$. We then consider FIG. 8 after the arrival of the 1st sample: in the $t_1$ the following are performed: inscription of the sample X in the register $R_2$, that is to say, as we have just seen, of the binary quantity 0010110000 with its sign 1 and the inscription of the result (which is zero) $-B_2Y_{2(1)}$ in the register $R_1$ with its sign 1; with $LB_2 = 0000000101$ (see Table I of the text);

in the time $t_2$ the following are performed: addition (or subtraction) of the contents of the registers $R_1$ and $R_2$ with inscription of the result in the register $R_2$ at the end of the time $t_2$; this is the operation $X - B_2Y_{2(1)}$ the result (0010110000) of which remains the same as in the time $t_1$ since $B_2Y_2 = 0$; there is also inscribed in the register $R_1$ the result of the product (zero) $- B_1Y_{1(1)}$; with $LB_1 = 0000100000$ (see Table II of the text); in the time $t_3$, the following are performed: addition or subtraction of the contents of registers $R_1$ and $R_2$ with inscription register 2 at the end of the time $t_3$, that is to say, the operation $X - B_2Y_{2(1)} - B_1Y_{1(1)} = Y_{(1)}$, translated by 0010110000 with the sign 1; inscription of the word of store $LY_1$ in store $M_2$ at the end of the time $t_3$; the operation $-1 \times Y_{2(1)}$ with inscription of the result in register $R_1$ at the end of the time $t_3$ (see Table III of the text).

in the time $t_4$ the following are performed: inscription, at the end of time $t_4$, in store $M_1$, of the logarithm of in contents of register $R_2$; the contents of register $R_2$ in binary form is the number 0010110000 which, in logarithmic form, is 0111, 011000; inscription in the register $R_2$, at the end of the time $t_4$, of the contents of register $R_2$ divided by $2^5 = 32$ gain of the first cell, that is to say in fact, inscription in register $R_2$ of the contents of the register shifted to the right (low weight side) by five elements, that is to say by $S_1/32$ or 0000000101; inscription in register $R_1$ of the product $- B_2Y_{2(2)}$ which is zero with its sign 1;

in the time $t_5$ the following are performed: addition (or subtraction) of the contents of registers $R_1$ and $R_2$ with inscription in register $R_2$ at the end of the time $t_5$; this is the operation $S_1/32 - B_2Y_{2(2)}$ translated by the binary number 0000000101 with the sign 1, since $- B_2Y_{2(2)}$ is zero; finally, inscription in register $R_1$ of the product $- B_1Y_{1(2)}$ which is zero with the sign 1;

in the time $t_6$ the following are performed: addition (or subtraction) of the contents of registers $R_1$ and $R_2$ with inscription in register $R_2$ at the end of the time $t_6$; this is the operation $S_1/32 - B_2Y_{2(2)} - B_1Y_{1(2)} = Y_2$, which is again translated by the same binary number 0000000101, since $- BY_{2(2)}$ and $- B_1Y_{1(2)}$ are zero; then the operation $-1 \times Y_{2(2)}$ with inscription in the register $R_1$ at the end of the time $t_6$; finally, inscription of $LY_1$ in store $M_2$; the following time $t_1$, therefore, concerns simultaneously the end of the treatment of the sample in progress $C_2E_1$ and the commencement of the treatment of the next sample $C_1E_2$ (FIG. 9). Register $R_1$ indicates the magnitude of the output S after the treatment of the 1st sample which is the transfer of register $R_2$ of the time $t_6$, that is to say 0000000101; register $R_1$ receives $B_2Y_2$ which is zero; register $R_2$ receives the new input sample, assumed to be the same as in the preceding cycle, that is to say 0010110000 with the sign 1;

in the store $M_3$ there is again, as at the time $t_1$ of the 1st cycle, the quantity $LB_2$ expressed by the binary number 0000000101; the store $M_1$ contains the logarithm of the input sample in binary code, that is to say, 0111011000, left since the time $t_4$ of the preceding cycle;

in the time $t_2$ of the 2nd cycle, the following are performed: addition (or subtraction) of the contents of registers $R_1$ and $R_2$, that is to say, the operation $X - B_2Y_2$ which is inscribed in register $R_2$ at the end of the time $t_2$ under the binary number 0010110000, which in fact amounts to transferring $R_2$ since $R_1$ is zero; in register $R_1$ there is also inscribed the result of the product $-B_1Y_1$, that is to say, the sum of the stores $M_3$ and $M_1$, i.e., the binary number 0011110000 with $LB_1$ = 000010000 and $LY$=0111011000; in the time $t_3$ of the 2nd cycle the following are performed: addition (or subtraction) of the contents of the registers $R_1$ $R_2$ with inscription in register $R_2$ at the end of the time $t_3$, that is to say, the operation $X-B_2Y_2-B_1Y_1$, translated by the binary number 0001000000; inscription of the word of store $LY_1$ in store $M_2$ at the end of the time $t_3$; the operation $-1 \times Y_2$ with inscription of the result in register $R_1$ at the end of the time $t_3$;

in the time $t_4$ of the 2nd cycle, the following are performed: inscription at the end of time $t_4$, in the store $M_1$, of the quantity $LY$ which in binary form is the number 0111011000; inscription in register $R_2$ at the end of the time $t_4$ of the contents of register $R_2$ divided by $2^5 = 32$, gain of the preceding cell, that is to say in fact, inscription in register $R_2$ of the contents of the register shifted to the right (low weight side) by five elements, thais to say, $S_1/32$ or 0000000010; inscription in register R of the product $-B_2Y_2$, which is zero with its sign 1;

in the time $t_5$ of the 2nd cycle the following are performed: addition (or subtraction) of the contents of registers $R_1$ and $R_2$ with inscription in register $R_2$ at the end of the time $t_5$, which amounts practically to preserving the contents of the register $R_2$ since the content of $R_1$ is zero; finally, inscription in register $R_1$ of the product $-B_1Y_1$, that is to say, of the sum of the stores $M_3$ and $M_1$, or the binary number 0000000111 after log-linear conversion;

in the time $t_6$ of the 2nd cycle, the following are performed: addition (or subtraction) of the contents of registers $R_1$ and $R_2$ with inscription in register $R_2$ at the end of the time 6 of the binary number 0000001001; then the operation $-1 \times Y_2$ with inscription in register $R_1$, or here zero result with the sign 1.

Of course, the invention is by no means limited to the embodiment described and shown, which has been given only as an example; more particularly it will be possible to modify certain arrangements or replace certain means by equivalent means without departing from the scope of the invention.

We claim:

1. A numerical frequency analyzing apparatus for use in a telecommunication system comprising:
- means for receiving binary coded samples of voice frequency signals; and
- means for detecting component frequencies among each of a plurality of said frequency signals, the frequencies being detected from a predetermined number of frequencies including:
- a plurality of band-pass digital filters corresponding to said predetermined number of frequencies in the signals capable of being received, coupled to the output of said receiving means ,
- means responsive to the outputs of said digital filters for determining the amount of energy in the outputs thereof, and
- means, responsive to said energy determining means, for selecting filters corresponding to component frequencies of each signal , the energies of which exceed a predetermined threshold level.

2. An apparatus according to claim 1, wherein said plurality of band-pass filters are formed from a combination of a computing circuit and a plurality of accessory store elements connected thereto, wherein said computing circuit receives an input signal sample $X$ at a prescribed sampling frequency, and provides a first intermediate resultant quantity $Y = X - B_2Y_2 - B_1Y_1$, where $B_1$ and $B_2$ represent first and second characteristic constant coefficients of a filter and $Y_1$ and $Y_2$ represent said quantity Y which has been delayed through first and second sampling delay periods, and an output quantity $S = Y - Y_2$ wherein the quantities $B_1$,$B_2$ ,$Y_1$,$Y_2$ are registered in said accessory store elements and wherein said energy determining means includes means for summing the sample outputs of said computing circuit.

3. An apparatus according to claim 2, wherein said computing circuit comprises:
- a first computing block means, responsive to the contents of said accessory store elements for combining said contents in the form of logarithmic quantities;
- a first converter means, responsive to the outputs of said first computing block means, for converting said logarithmic quantities into first linear quantities;
- a first register, responsive to the output of said first converter means for storing said first linear quantities;
- a second computing block means, responsive to the output of said first register, for combining said first linear quantities;
- a second register, responsive to the output of said second computing block means, for storing the output of said second computing block means in linear form;
- a third register, responsive to the output of said second computing block means and linear quantities representative of said input sample, for storing the inputs thereto, the outputs of said third register being connected to one input of said second computing block means; and
- a second converting means responsive to the outputs of said third register, for converting the contents thereof into logarithmic form and feeding said logarithmic quantities to one of said accessory store elements;
- and further including means for supplying timing signals to each element within said computing circuit for controlling the sequential operation thereof.

4. An apparatus according to claim 3, wherein said energy determining means comprises:
- said summing means including a detector-adder circuit, responsive to the output of said second register, for rectifying the amplitudes of the sample outputs thereof and summing said rectified amplitudes of a prescribed number of successive signal samples;
- a calculation store element, responsive to the summed sample outputs of said detector-adder circuit, for storing successive sum quantities of samples corresponding to the respective digital filters;
- means, responsive to the stored sums in said calculation store element, for shifting and weighting said quantities and providing said shifted and weighted quantities at a plurality of respective outputs; and wherein said selecting means includes a maximum value testing circuit for determining, from among the outputs of said shifting means, the quantity having the maximum amount of energy.

5. An apparatus according to claim 4, wherein said plurality of accessory storage elements comprises first, second and third accessory store elements, said first accessory store element storing the logarithmic of said quantities $Y$ and $Y_1$, the output of said first accessory store being connected to said computing circuit and to the input of said second accessory store circuit for storing the logarithm of the quantity $Y_2$, and wherein said third accessory store stores the logarithms of said characteristic filter constant coefficients $B_1$ and $B_2$, the outputs of said second and third accessory store elements being connected to said computing circuit.

6. An apparatus in accordance with claim 4, wherein said detector adder circuit includes a first input connected to the output of said second register and a second input connected to the output of said calculation store element.

7. An apparatus in accordance with claim 6, wherein said selecting means includes means, responsive to the contents of said shifting means, for testing the ratio of the respective outputs thereof and for indicating the presence of a selected frequency only when said ratio exceeds a predetermined value.

8. A method of analyzing samples of voice frequency signals comprising the steps of:

a. simultaneously adding, in a first computing block means, the logarithms of a first quantity $B_2$ of a band-pass digital filter provided in a plurality of band-pass digital filters corresponding to the respective different component frequencies in which useful information is contained and to which information signals are applied, a quantity $Y_2$ corresponding to a quantity $Y = X - B_2Y_2 - B_1 Y_1$, which has been delayed through first and second sampling delay periods, where $B_1$ and $B_2$ represent first and second characteristic constant coefficients of a filter, and $Y_1$ and $Y_2$ represent said quantity $Y$ which has been delayed through first and second sampling delay periods, respectively, the logarithms of said quantities $Y_1$, $Y_2$, $B_1$ and $B_2$ being stored in a plurality of accessory store elements, said first computing block means being responsive to the contents thereof in the form of logarithmic quantities, and
storing an input sample $X$ in a first register and, subsequently,
converting in a first converter means, responsive to the output of said first computing block means, for converting the logarithmic quantity of said first computing block means into first linear quantities, the logarithmic sum of said output $B_2$ and $Y_2$ into a linear quantity $B_2 Y_2$ and
storing said quantity $B_2 Y_2$ in a second register which is responsive to the output of said first converter means, during a first period of time;

b. adding, in said first computing block means, the logarithm of the quantities $B_1$ and $Y_1$ and
subtracting, in a second computing block means, which is responsive to the output of said second register, for combining said first linear quantities, the quantity $B_2 Y_2$ from the input signal sample $X$, simultaneously, and
subsequently, converting the sum of the logarithms $B_1$ and $Y_1$ into a linear quantity $B_1 Y_1$, in said first converter means, and
storing said quantity $B_1 Y_1$ in said second register, and storing the difference quantity $X - B_2 Y_2$ in said first register, during a second period of time;

c. combining the linear quantities $X - B_2Y_2$, and $B_1 Y_1$ in accordance with the equation $Y = X - B_2 Y_2 - B_1 Y_1$ in said second computing block means,
storing the logarithm of the quantity $Y_1$ in one of said plurality of accessory store elements and applying the logarithm of the quantity $Y_2$ to said first computing block means, simultaneously, and
converting the logarithm of the quantity $Y_2$ into a linear quantity in said first converter means and storing said linear quantity $Y_2$ in said second register and, further
storing in said first register said quantity $Y$, resulting from the combination of the linear quantities $X$, $B_2 Y_2$ and $B_1 Y_1$ in said second computing block means, during a third period of time;

d. subtracting, in said second computing block means, the output quantity $Y_2$ from the quantity $Y$, to product a difference quantity $S$ and
converting the quantity $Y$ into logarithmic form in a second converter means which is responsive to the output of said first register, for converting the contents thereof into logarithmic form and feeding said logarithmic quantities to a second of said accessory store elements, and
subsequently storing said quantity S in a third register, which is responsive to the output of said second computing block means, for storing the output of said second computing block means in linear form, and the logarithm of the quantity $Y$ in said second of said accessory store elements, respectively during a fourth period of time; and
repeating step (a) coincident with the execution of step (d).

* * * * *